United States Patent
Hayek et al.

[19]

[11] Patent Number: 6,000,017

[45] Date of Patent: Dec. 7, 1999

[54] HYBRID TAG ARCHITECTURE FOR A CACHE MEMORY

[75] Inventors: George Hayek, Cameron Park; Richard Malinowski, Placerville, both of Calif.

[73] Assignee: Intel Corporation, Santa Clara, Calif.

[21] Appl. No.: 08/909,347

[22] Filed: Aug. 11, 1997

Related U.S. Application Data

[63] Continuation of application No. 08/375,846, Jan. 20, 1995, abandoned.

[51] Int. Cl.[6] ........................................... G06F 12/08
[52] U.S. Cl. .................................. 711/144; 711/143
[58] Field of Search .................... 395/471, 470, 395/468, 472, 483, 449; 711/144, 143, 141, 145, 156, 122

[56] References Cited

U.S. PATENT DOCUMENTS

| | | | |
|---|---|---|---|
| 4,939,641 | 7/1990 | Schwartz et al. | 711/144 |
| 5,113,514 | 5/1992 | Albonesi et al. | 711/144 |
| 5,287,484 | 2/1994 | Nishii et al. | 711/144 |
| 5,339,399 | 8/1994 | Lee et al. | 711/146 |
| 5,353,410 | 10/1994 | Macon, Jr. et al. | 711/144 |
| 5,423,019 | 6/1995 | Lin | 711/135 |
| 5,426,771 | 6/1995 | Asprey et al. | 395/550 |
| 5,430,683 | 7/1995 | Hardin et al. | 365/227 |
| 5,434,993 | 7/1995 | Liencres et al. | 711/133 |
| 5,469,555 | 11/1995 | Ghosh et al. | 711/133 |
| 5,632,038 | 5/1997 | Fuller | 711/144 |

*Primary Examiner*—Reginald G. Bragdon
*Attorney, Agent, or Firm*—Blakely, Sokoloff, Taylor & Zafman

[57] ABSTRACT

A cache memory system having a hybrid tag architecture and a series of data lines is disclosed. The cache memory includes a cache controller and a dirty tag memory included within the cache controller. The dirty tag memory indicates the status of each data line in the cache memory. A tag memory is coupled to the cache controller and is located external to the cache controller.

21 Claims, 4 Drawing Sheets

HYBRID TAG ARCHITECTURE FOR A CACHE MEMORY

This is a continuation of application Ser. No. 08/375,846, filed Jan. 20, 1995, now abandoned.

BACKGROUND OF THE INVENTION

1. Field of the Invention

The present invention pertains to the field of computer systems. More particularly, this invention relates to an architecture for a cache memory that employs a hybrid arrangement of cache tags.

2. Background

Prior computer systems commonly include one or more cache memories. A typical cache memory is a fast access memory that stores data reflecting selected locations in a corresponding main memory of the computer system. Such a cache memory is usually comprised of static random access memorys (SRAM). Typically, the data stored in such a cache memory is organized into data sets which are commonly referred to as cache lines or data lines.

Such cache memories usually include storage areas for a set of tags that correspond to each data line. Such tags typically include address tags that identify an area of the main memory that maps to the corresponding data line. In addition, such cache tags usually provide status information for the corresponding data line.

One type of cache memory is known as a write-back cache memory. Such a cache memory typically includes tag bits that indicate the update status of the data lines stored in the cache in relation to the corresponding data line in the main memory. Such status tag bits are commonly referred to as "dirty" tags. Typically, a dirty tag indicates whether the corresponding cache line contains updated or "dirty" information not reflected in the corresponding location in the main memory.

Such a write-back cache memory typically conserves the bandwidth for accesses to the corresponding main memory by preventing some possibly unneeded writes of data to the main memory when it is present in the cache. However, such a write-back cache requires that at least one dirty tag bit be allocated to each cache line entry, in order to manage data coherency between the cache and main memory. In addition, the time required to update a dirty tag bit during a write transaction is a limiting factor in the overall speed of write cycles to memory in such systems.

One prior type of write-back cache memory includes a standard SRAM that stores the cache memory tags. Typically, such a tag SRAM stores the address tags as well as clean/dirty and other status tags. Such a cache memory typically includes a cache controller circuit with internal comparators. Such a cache controller circuit typically reads the external tag SRAM during a memory write cycle and then determines whether the write cycle "hits" or "misses" a data line in data store portion of the cache memory. The cache controller circuit usually determines an updated value for the appropriate dirty tag if a write hit is detected. Such a write-back cache offers the advantage of relatively low cost due to the availability in volume of external standard tag SRAM. Unfortunately, such cache memories usually provide relatively low performance during write cycles due to the speed limitations imposed by updates of the tag SRAM during write hits.

Other prior write-back cache memories employ custom tag SRAMs that include internal registers. Such custom tag SRAMs typically latch the address of write transactions to enable the proper updating of the dirty tag bits during high bandwidth write transactions. Unfortunately, such custom tag SRAMs are typically much more expensive than standard SRAM based tags and increases the overall cost of such a computer system.

Still other prior write-back cache memories employ custom cache controllers that include integrated tag SRAMs. Such custom integrated tag SRAMs enable fast update of internal dirty tag bits during write transactions. Unfortunately, such an integration of SRAM with a cache controller typically increases the overall cost of the cache memory. In addition, prior cache controller design technologies such as application specific integrated circuits are not well suited for the implementation of custom tag SRAMs.

SUMMARY OF THE INVENTION

A cache memory is disclosed having a cache controller that includes an integrated dirty tag memory. The cache memory also includes an external tag memory. The cache controller writes the integrated dirty tag memory during all memory write transactions detected on a bus coupled to the cache memory. The cache controller writes the integrated dirty tag memory to indicate a dirty data line during memory write transactions that cause a hit to a data line stored in the cache memory. The cache controller writes the integrated dirty tag memory with an old dirty status during memory write transactions that do not cause a hit to a data line stored in the cache memory.

Other features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
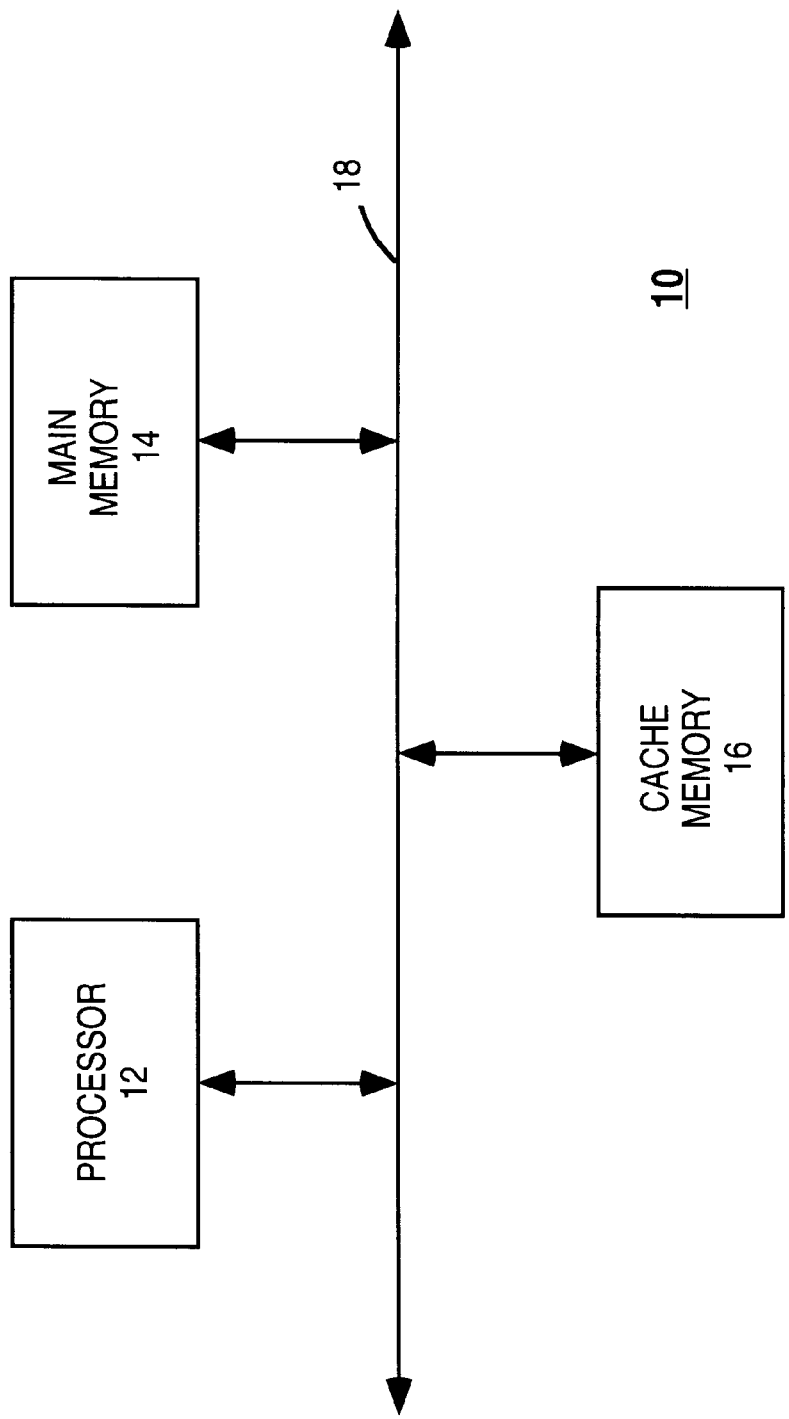
FIG. 1 illustrates a computer system for one embodiment which comprises a processor, a main memory, and a cache memory.

FIG. 1 illustrates a computer system 10 for one embodiment. The computer system 10 comprises a processor 12, a main memory 14, and a cache memory 16. The processor 12, the main memory 14 and the cache memory 16 are each coupled for communication over a host bus 18.

The cache memory 16 functions as a level two (L2) write-back cache memory for the computer system 10. The cache memory 16 stores a set of data lines or cache lines that reflect selected locations in the main memory 14. The cache memory 16 also contains a set of tags that identify the data lines stored in the cache memory 16 and that include status information for the data lines stored in the cache memory 16. The status information includes a clean/dirty tag bit for each data line stored in the cache memory 16.

The processor 12 issues write transactions over the host bus 18 targeted for locations in the main memory 14. The cache memory 16 determines whether each write transaction on the host bus 18 is targeted for a data line contained within the cache memory 16. If the write transaction over the host bus 18 is targeted for a data line stored in the cache memory 16 then the cache memory 16 updates the corresponding clean/dirty tag bit for that cache line to indicate "dirty" status. For such transactions, the cache memory 16 also provides an acknowledgment over the host bus 18 to allow subsequent transactions to occur over the host bus 18 without an intervening access by the cache memory 16 to update the data in the main memory 14.

Figure 2:
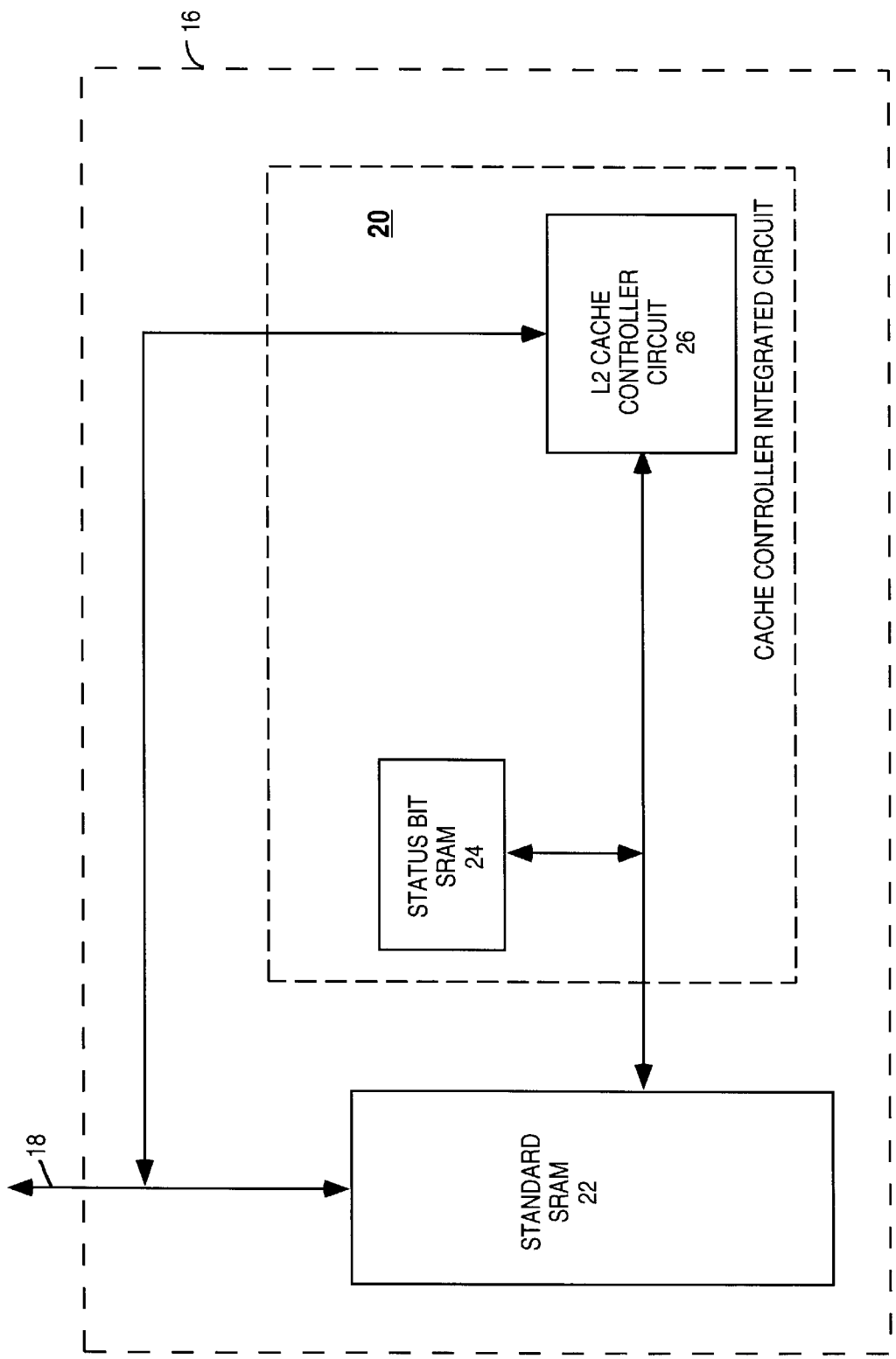
FIG. 2 illustrates the cache memory for one embodiment which includes a cache controller integrated circuit and a standard external SRAM.

FIG. 2 illustrates the cache memory 16 for one embodiment. The cache memory 16 comprises a cache controller integrated circuit 20 and a standard external SRAM 22. The SRAM 22 stores address tags for a set of corresponding data lines stored in the cache memory 16.

The cache controller integrated circuit 20 functions as an L2 cache controller for the cache memory 16. The cache controller integrated circuit 20 includes an L2 cache controller circuit 26, and a status bit SRAM 24. The status bit SRAM 24 stores clean/dirty tag bits that correspond to data lines stored in the cache memory 16. The tags stored in the standard SRAM 22 and the tag status bits stored in the status bit SRAM 24 together provide a set of hybrid tags for the cache memory 16.

For one embodiment, the SRAM 22 also includes valid tags for the data lines stored in the cache memory 16. For another embodiment, the status bit SRAM 24 includes the valid tags.

During write transactions to the main memory 14 over the host bus 18, the L2 cache controller circuit 26 receives and latches the memory address transferred over the host bus 18. The L2 cache controller circuit 26 then reads the corresponding tags from the standard SRAM 22 to determine whether the corresponding write cycle on the host bus 18 causes a hit or a miss to a data line stored in the cache memory 16. The L2 cache controller circuit 26 then accordingly updates the appropriate clean/dirty tag bit in the status bit SRAM 24.

The relatively small size of the status bit SRAM 24 in comparison to the standard SRAM 22 provides a balance between low system cost and fast access to the clean/dirty tag bits during write transactions to the cache memory 16. The hybrid tag architecture that includes the standard SRAM 22 and the status bit SRAM 24 provides relatively low cost for the cache memory 16 because most of the tag information for the cache lines stored in the cache memory 16 is contained in the standard SRAM 22. Only critical data path information that includes the clean/dirty tag bits are stored in the status bit SRAM 24 for fast access by the L2 cache controller circuit 26.

Figure 3:
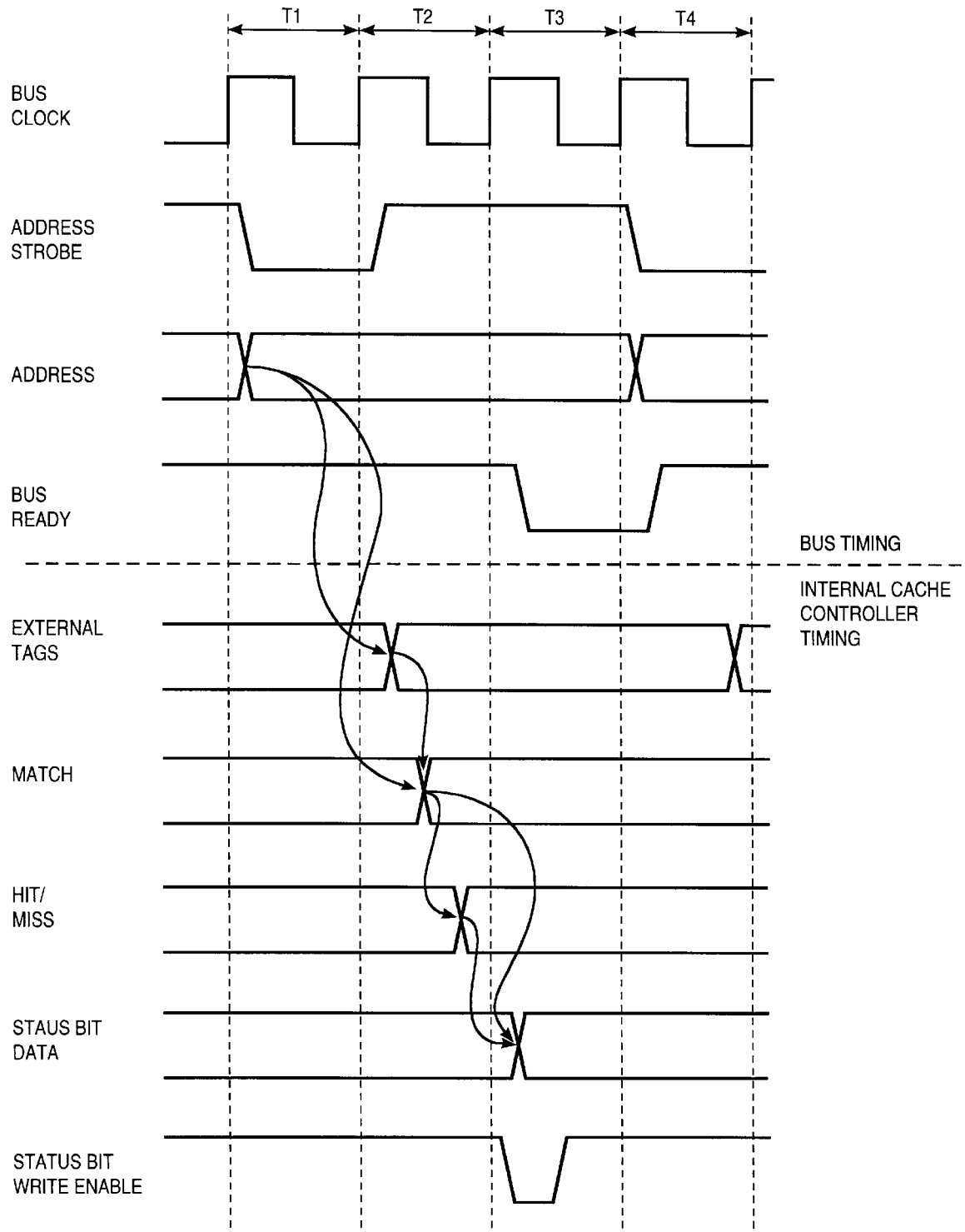
FIG. 3 illustrates timing of a write memory transaction over the host bus that causes a hit in the cache memory.

FIG. 3 illustrates timing of a write memory transaction over the host bus 18 that causes a hit in the cache memory 16. The relevant signals present on the host bus 18 include a bus clock signal, an address strobe signal, an address signal, and a bus ready signal.

The internal timing signals for the cache controller integrated circuit 20 include a set of external tags that are read from the standard SRAM 22 by the L2 cache controller circuit 26. Timing signals internal to the L2 cache controller circuit 26 include a match signal that indicates whether the address of the data line addressed on the host bus 18 matches the address associated with a data line potentially cached within the cache memory 16. The hit/miss signal is a result of a match qualified with a valid tag and indicates whether the data line addressed on the host bus 18 is cached within the cache memory 16. The status bit data internal to the L2 cache controller circuit 26 is used to update the corresponding clean/dirty tag bit in the status bit SRAM 24. In addition, the L2 cache controller circuit 26 generates a status bit write enable signal for the status bit SRAM 24.

The L2 cache controller circuit 26 generates the status bit write enable signal upon detection of a memory write transaction over the host bus 18. The L2 cache controller circuit 26 writes to the status bit SRAM 24 by generating the status bit write enable during all memory write transactions detected over the host bus 18. The L2 cache controller circuit 26 uses the status bit data written to the status bit SRAM 24 to update the clean/dirty tag bit with either a new value required by the memory transaction or by an old value read from the status bit SRAM 24.

During clock period Ti, the address strobe and the address signals on the host bus 18 indicate a valid address is available. Some time during the clock period T2, the L2 cache controller circuit 26 receives the external tags from the standard SRAM 22. The external tags comprise the address tags that correspond to the address on the host bus 18. During clock period T2, the L2 cache controller circuit 26 determines whether a match occurs between the address on the host bus 18 and the external tags received from the standard SRAM 22 that result from the address on the host bus 18.

During clock period T2, the L2 cache controller circuit 26 determines whether a hit or a miss occurs to a cache data line stored in the cache memory 16. Early in clock period T3, the L2 cache controller circuit 26 initiates the status bit write enable signal to generate a write into the status bit SRAM 24. Thereafter, and still during clock period T3, the L2 cache controller circuit 26 uses the hit/miss signal to generate the proper values for the status bit data transferred to the status bit SRAM 24. Thereafter, and still during clock period T3, the status bit write enable signal transitions from a low to a high level to cause a write of the status bit data into the status bit SRAM 24.

Figure 4:
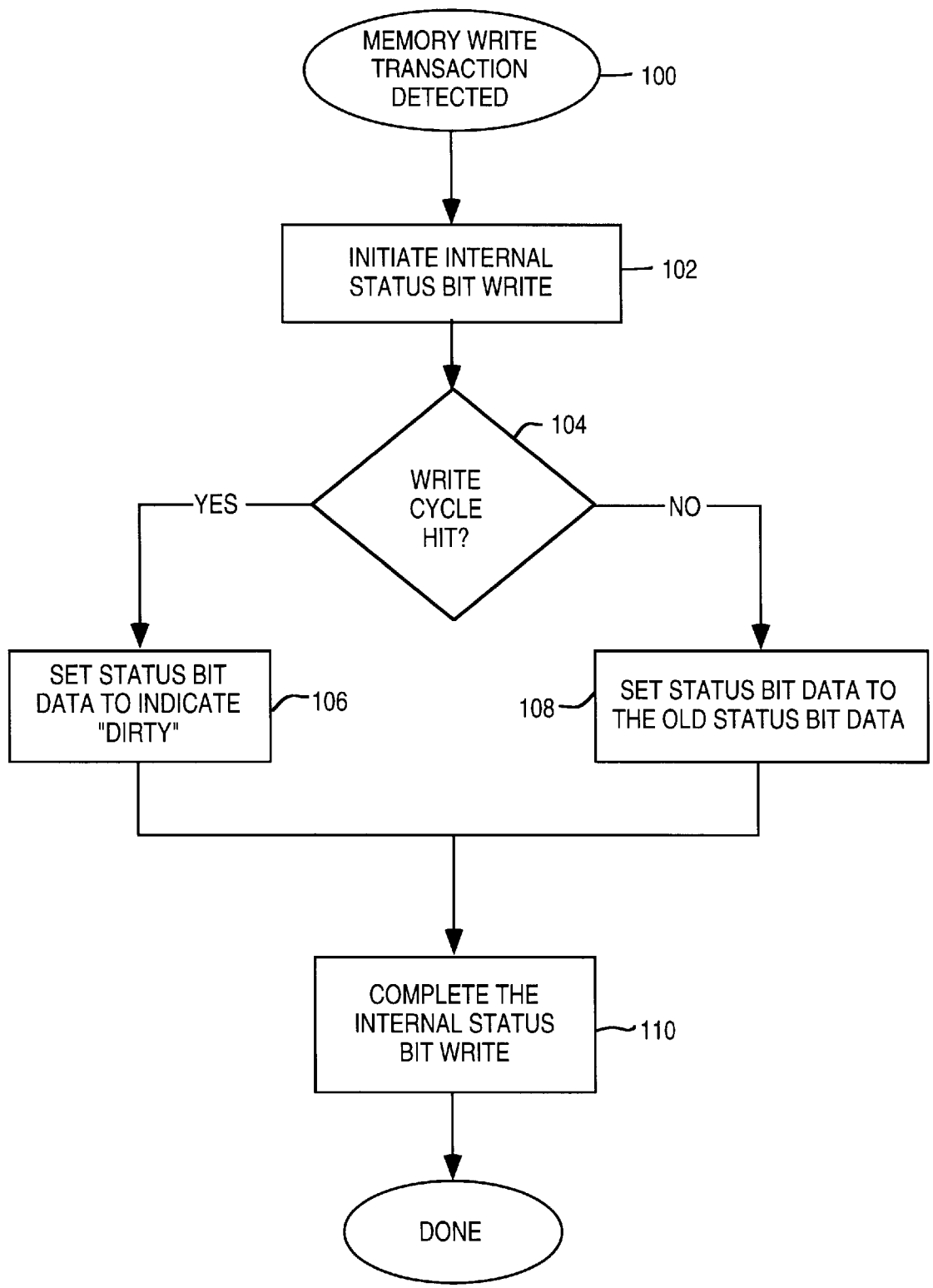
FIG. 4 is a flow diagram that illustrates the handling of a memory write transaction over the host bus to the cache memory.

FIG. 4 is a flow diagram that illustrates the handling of a memory write transaction over the host bus 18 to the cache memory 16. At block 100, the L2 cache controller circuit 26 detects a memory write transaction over the host bus 18. Thereafter at block 102, the L2 cache controller circuit 26 initiates an internal status bit write to the status bit SRAM 24. Block 102 corresponds to the high or low transition of the status bit write enable signal early during clock period T3 as illustrated in FIG. 3.

Thereafter at decision block 104, the L2 cache controller circuit 26 determines whether the write cycle causes a hit in the cache memory 16. If the write cycle causes a hit in the cache memory 16 at decision block 104, then control proceeds to block 106. At block 106, the L2 cache controller circuit 26 sets the status bit data transferred to the status bit SRAM 24 to indicate "dirty" status for the corresponding cache line.

If the write cycle did not cause a hit to the cache memory 16 at decision block 104, then control proceeds to block 108. At block 108, the L2 cache controller circuit 26 sets the status bit data transferred to the status bit SRAM 24 to the old status bit data read from the status bit SRAM 24.

Control then proceeds to block 110 whether or not the write cycle causes a hit to the cache memory 16. At block 110, the L2 cache controller circuit 26 completes the internal status bit write to the status bit SRAM 24 with the status bit data set either during block 106 or block 108.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A cache memory comprising:
    a cache controller having a dirty tag memory, the dirty tag memory indicating a dirty status for each data line in the cache memory, wherein the cache controller writes to the dirty tag memory during memory write transactions regardless of whether a cache hit or a cache miss occurred; and
    a tag memory coupled to the cache controller, wherein the tag memory stores address tags, and wherein the tag memory is external to the cache controller.

2. The cache memory of claim 1, wherein the cache controller writes the dirty tag memory to indicate a dirty data line during memory write transactions that cause a hit to a data line stored in the cache memory.

3. The cache memory of claim 1, wherein the cache controller writes the dirty tag memory with an old dirty status during memory write transactions that do not cause a hit to a data line stored in the cache memory.

4. The cache memory of claim 1, wherein the dirty tag memory stores a set of dirty tags that correspond to a set of data lines stored in the cache memory.

5. The cache memory of claim 1, wherein the dirty tag memory stores a set of dirty tags and a set of valid tags that correspond to a set of data lines stored in the cache memory.

6. A cache controller for a cache memory and tag memory external to the cache controller, the cache controller comprising:
    a dirty tag memory configured to store dirty tags for the cache memory, the dirty tag memory indicating a dirty status for each data line in the cache memory, ; and
    a controller circuit to write to the dirty tag memory during all memory write transactions detected on a bus coupled to the cache controller regardless of whether a cache hit or a cache miss occurred.

7. The cache controller of claim 6, wherein the controller circuit writes the dirty tag memory to indicate a dirty data line during memory write transactions that cause a hit to a data line stored in the cache memory.

8. The cache controller of claim 6, wherein the controller circuit writes the dirty tag memory with an old dirty status during memory write transactions that do not cause a hit to a data line stored in the cache memory.

9. The cache controller of claim 6, wherein the dirty tag memory stores the dirty tags that correspond to a set of data lines stored in the cache memory.

10. The cache controller of claim 6, wherein the dirty tag memory stores the dirty tags and a set of valid tags that correspond to a set of data lines stored in the cache memory.

11. A coherency method for a cache memory comprising the steps of:
    storing tag status bits for the cache memory in a dirty tag memory located within a cache controller for the cache memory to indicate a dirty status for each data line during memory write transactions independent of occurrence of cache hit and cache miss; and
    storing address tags for the cache memory in a tag memory coupled to the cache controller, wherein the tag memory is external to the cache controller.

12. The coherency method of claim 11, further comprising the step of writing the dirty tag memory during all memory write transactions detected on a bus coupled to the cache memory.

13. The coherency method of claim 12, further comprising the step of writing the dirty tag memory to indicate a dirty data line during memory write transactions that cause a hit to a data line stored in the cache memory.

14. The coherency method of claim 12, further comprising the step of writing the dirty tag memory with an old dirty status during memory write transactions that do not cause a hit to a data line stored in the cache memory.

15. The coherency method of claim 11, wherein the step of storing tag status bits for the cache memory in a dirty tag memory comprises the step of storing a set of dirty tags that correspond to a set of data lines stored in the cache memory.

16. The coherency method of claim 11, wherein the step of storing tag status bits for the cache memory in a dirty tag memory comprises the step of storing a set of dirty tags and a set of valid tags that correspond to a set of data lines stored in the cache memory.

17. A cache memory having a plurality of data lines, the cache memory comprising:
    a cache controller;
    a dirty tag memory located within the cache controller, wherein the dirty tag memory indicates a status of each data line in the cache memory, wherein the cache controller writes the dirty tag memory during all memory write transactions regardless of whether a cache hit or a cache miss occurred; and
    a tag memory coupled to the cache controller and located external to the cache controller, wherein the tag memory is configured to store address tags.

18. The cache memory of claim 17 wherein the dirty tag memory contains a set of dirty tags, the set of dirty tags corresponding to a particular set of data lines in the cache memory.

19. The cache memory of claim 18 wherein the set of dirty tags are updated upon receiving a memory write transaction that causes a hit to the set of data lines.

20. The cache memory of claim 17 wherein the dirty tag memory contains a set of dirty tags and a set of valid tags, the set of dirty tags and valid tags corresponding to a particular set of data lines in the cache memory.

21. The cache memory of claim 20 wherein the set of dirty tags and the set of valid tags are updated upon receiving a memory write transaction that causes a hit to the set of data lines.

* * * * *